US011996062B2

(12) United States Patent
Guan et al.

(10) Patent No.: US 11,996,062 B2
(45) Date of Patent: May 28, 2024

(54) GATE DRIVING CIRCUIT AND DISPLAY PANEL

(71) Applicant: WUHAN CHINA STAR OPTOELECTRONICS TECHNOLOGY CO., LTD., Wuhan (CN)

(72) Inventors: Yanqing Guan, Wuhan (CN); Chao Tian, Wuhan (CN); Haiming Cao, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/419,876

(22) PCT Filed: May 31, 2021

(86) PCT No.: PCT/CN2021/097130
§ 371 (c)(1),
(2) Date: Nov. 24, 2022

(87) PCT Pub. No.: WO2022/241821
PCT Pub. Date: Nov. 24, 2022

(65) Prior Publication Data
US 2023/0402019 A1 Dec. 14, 2023

(30) Foreign Application Priority Data
May 18, 2021 (CN) ......................... 202110539968.1

(51) Int. Cl.
*G09G 3/36* (2006.01)

(52) U.S. Cl.
CPC ... *G09G 3/3677* (2013.01); *G09G 2300/0876* (2013.01)

(58) Field of Classification Search
None
See application file for complete search history.

(56) References Cited

U.S. PATENT DOCUMENTS

2015/0206490 A1* 7/2015 Lim ..................... G09G 3/3677 327/109
2018/0108290 A1* 4/2018 Chen .................... G09G 3/2092
(Continued)

FOREIGN PATENT DOCUMENTS

CN 101303896 A 11/2008
CN 102915714 A 2/2013
(Continued)

OTHER PUBLICATIONS

International Search Report in International application No. PCT/CN2021/097130,dated Feb. 15, 2022.
(Continued)

*Primary Examiner* — Krishna P Neupane
(74) *Attorney, Agent, or Firm* — PV IP PC; Wei Te Chung; Zhigang Ma

(57) ABSTRACT

A display panel and a gate driving circuit are provided. The gate driving circuit utilizes the pull-down control module to periodically pull up and pull down the voltage level of the second node. The voltage level of the second node is periodically a high voltage level. This effectively reduces the time duration when the second node corresponds to the high voltage level. After the TFTs electrically connected to the second node are forward biased, the TFTs could have sufficient recovery time. This solution effectively improves the bias condition of the TFTs in the pull-down control module and thus makes the circuit more stable and raises the reliability of the circuit.

20 Claims, 4 Drawing Sheets

(56) References Cited

U.S. PATENT DOCUMENTS

| | | | | |
|---|---|---|---|---|
| 2019/0157305 | A1 | 5/2019 | Umezaki | |
| 2020/0372873 | A1* | 11/2020 | Huang | G09G 3/3677 |
| 2021/0287598 | A1* | 9/2021 | Xue | G11C 19/28 |
| 2021/0333973 | A1* | 10/2021 | Su | G11C 19/28 |

FOREIGN PATENT DOCUMENTS

| | | | |
|---|---|---|---|
| CN | 104992661 | A | 10/2015 |
| CN | 109584816 | A | 4/2019 |
| CN | 110264948 | A | 9/2019 |
| CN | 111477153 | A | 7/2020 |

OTHER PUBLICATIONS

Written Opinion of the International Search Authority in International application No. PCT/CN2021/097130,dated Feb. 15, 2022.

Chinese Office Action issued in corresponding Chinese Patent Application No. 202110539968.1 dated Dec. 1, 2021, pp. 1-12.

Chinese Office Action issued in corresponding Chinese Patent Application No. 202110539968.1 dated Apr. 12, 2022, pp. 1-9.

Chinese Decision of Rejection issued in corresponding Chinese Patent Application No. 202110539968.1 dated Jul. 29, 2022, pp. 1-10.

Japanese Office Action issued in corresponding Japanese Patent Application No. 2021-541539 dated Jul. 25, 2023, pp. 1-4.

Korean Office Action issued in corresponding Korean Patent Application No. 10-2021-7034718 dated Sep. 25, 2022, pp. 1-9.

* cited by examiner

GATE DRIVING CIRCUIT AND DISPLAY PANEL

RELATED APPLICATIONS

This application is a Notional Phase of PCT Patent Application No. PCT/CN2021/097130 having international filing date of May 31, 2021, which claims the benefit of priority of Chinese Patent Application No. 202110539968.1 filed on May 18, 2021. The contents of the above applications are all incorporated by reference as if fully set forth herein in their entirety.

FIELD OF THE DISCLOSURE

The present disclosure relates to a display technology, and more particularly, to a gate driving circuit and a display panel.

BACKGROUND

Liquid crystal displays (LCD) are widely used in all kinds of electronic devices as their displays. The gate driver on array (GOA) circuit is an important part of the LCD. The GOA technique uses the conventional thin film transistor (TFT) LCD array manufacturing process to form the gate driving circuit on the array substrate such that the LCD panel could be driven line by line.

The TFTs of the LCD panel could be negative channel-metal-oxide semiconductor (NMOS) transistors, positive channel-metal-oxide semiconductor (PMOS) transistors, or complementary channel-metal-oxide semiconductor (CMOS) transistor having both the NMOS transistor and the PMOS transistors. Similarly, the gate driving circuit could be an NMOS circuit, a PMOS circuit or a CMOS circuit. In contrast to the CMOS circuit, the NMOS circuit could be manufactured without complicated manufacturing process which means that the NMOS circuit has a better manufacturing yield and lower cost. Therefore, the industry needs to develop a stable NMOS circuit. In addition, the carriers of the NMOS TFT are electrons, which have better mobility. Compared with PMOS device, whose carriers are holes, the NMOS device is more easily damaged.

Conventionally, in order to make sure the panel could normally works, the circuit is pulled down and maintained its voltage level, which means that the gate of the TFT will be maintained at a high voltage level for a long period of time. This makes the TFT be biased too much and thus the TFT may be damaged. This would affect the high temperature reliability of the panel and makes the gate driving circuit not functional. It could introduce issues of screen divisions or abnormal display effect.

SUMMARY

One objective of an embodiment of the present disclosure is to provide a gate driving circuit and a display panel to prevent the transistors from being biased for a long period of time such that the circuit stability could be raised and the gate driving circuit could always work.

According to an embodiment of the present disclosure, a gate driving circuit is disclosed. The gate driving circuit comprises a plurality of cascaded gate driving units. Each of the driving units comprises: a pull-up control module, electrically connected to a first node, configured to control a voltage level of the first node; a pull-up module, electrically connected to the first node and a scan signal output end of a current stage, configured to pull up a voltage level of the scan signal output end of the current stage under a control of the voltage level of the first node; a pull-down module, electrically connected to the scan signal output end of the current stage, configured to pull down the voltage level of the scan signal output end of the current stage; and a pull-down control module, electrically connected to a second node, the first node, a first clock signal end and the scan signal output end of the current stage, configured to periodically pull down a voltage level of the second node under a control of an input signal of the first clock signal end to maintain the voltage level of the first node and the voltage level of the scan signal output end of the current stage.

Optionally, the pull-up control module comprises: a first transistor, having a gate electrically connected to a second clock signal end, a first electrode electrically connected to a scan signal output end of a previous stage, and a second electrode electrically connected to the first node; and a bootstrap capacitor, electrically connected to the first node and the scan signal output end of the gate driving unit of the current stage.

Optionally, the pull-up module comprises: a second transistor, having a gate electrically connected to the first node, a first electrode electrically connected to a third clock signal end, and a second electrode electrically connected to the scan signal output end of the gate driving unit of the current stage.

Optionally, the pull-down module comprises: a third transistor, having a gate electrically connected to a second clock signal end, a first electrode receiving a constant low voltage level signal, and a second electrode electrically connected to the scan signal output end of the gate driving unit of the current stage.

Optionally, the pull-down control module comprises: a fourth transistor, having a gate electrically connected to the first clock signal end, a first electrode receiving a constant low voltage level signal, and a second electrode electrically connected to the second node; a fifth transistor, having a gate electrically connected to the second node, a first electrode receiving the constant low voltage level signal, and a second electrode electrically connected to the first node; a sixth transistor, having a gate electrically connected to the first node, a first electrode receiving the constant low voltage level signal, and a second electrode electrically connected to the second node; a seventh transistor, having a gate electrically connected to a fourth clock signal end, a first electrode electrically connected to the fourth clock signal end, and a second electrode electrically connected to the second node; and an eighth transistor, having a gate electrically connected to the second node, a first electrode receiving the constant low voltage level signal, and a second electrode electrically connected to the scan signal output end of the gate driving unit of the current stage.

Optionally, the gate driving circuit further comprises: a reset module, receiving a reset signal and a constant low voltage signal and electrically connected to the first node and the second node, configured to reset the voltage level of the first node and the voltage level of the second node.

Optionally, the reset module comprises: a ninth transistor, having a gate receiving the reset signal, a first electrode receiving the constant low voltage signal, and a second electrode electrically connected to the second node; and a tenth transistor, having a gate receiving the reset signal, a first electrode receiving the constant low voltage signal, and a second electrode electrically connected to the first node.

Optionally, the gate driving circuit further comprises: a global switch control module, receiving a global switch control signal and a constant low voltage level signal and electrically connected to the scan signal output end of the gate driving unit of the current stage, configured to simultaneously control the voltage level of the scan signal output end of each of the gate driving units according to the global switch control signal and the constant low voltage level signal.

Optionally, the global switch control module comprises: an eleventh transistor, having a gate receiving the global switch control signal, a first electrode receiving the constant low voltage signal, and a second electrode electrically connected to the scan signal output end of the gate driving unit of the current stage.

Optionally, the gate driving circuit receives a first clock signal, a second clock signal, a third clock signal, a fourth clock signal, a fifth clock signal, a sixth clock signal, a seventh clock signal and an eighth clock signal; the gate driving circuit comprises a plurality of cascaded gate driving units of odd stages and a plurality of cascaded gate driving units of even stages; the plurality of cascaded gate driving units of the odd stages receive the first clock signal, the third clock signal, the fifth clock signal and the seventh clock signal; and the plurality of cascaded gate driving units of the even stages receive the second clock signal, the fourth clock signal, the sixth clock signal and the eighth clock signal.

Optionally, the gate driving unit of each stage is electrically connected to a second clock signal end, a third clock signal end, and a fourth clock signal end; in the cascaded gate driving units of odd stages, a first clock signal end of the gate driving unit of a $(1+8\ k)^{th}$ stage receives the third clock signal, a second clock signal end of the gate driving unit of the $(1+8\ k)^{th}$ stage receives the fifth clock signal, a third clock signal end of the gate driving unit of the $(1+8\ k)^{th}$ stage receives the first clock signal, and a fourth clock signal end of the gate driving unit of the $(1+8\ k)^{th}$ stage receives the seventh clock signal; a first clock signal end of the gate driving unit of a $(3+8\ k)^{th}$ stage receives the fifth clock signal, a second clock signal end of the gate driving unit of the $(3+8\ k)^{th}$ stage receives the seventh clock signal, a third clock signal end of the gate driving unit of the $(3+8\ k)^{th}$ stage receives the third clock signal, and a fourth clock signal end of the gate driving unit of the $(3+8\ k)^{th}$ stage receives the first clock signal; a first clock signal end of the gate driving unit of a $(5+8\ k)^{th}$ stage receives the seventh clock signal, a second clock signal end of the gate driving unit of the $(5+8\ k)^{th}$ stage receives the first clock signal, a third clock signal end of the gate driving unit of the $(5+8\ k)^{th}$ stage receives the fifth clock signal, and a fourth clock signal end of the gate driving unit of the $(5+8\ k)^{th}$ stage receives the third clock signal; a first clock signal end of the gate driving unit of a $(7+8\ k)^{th}$ stage receives the first clock signal, a second clock signal end of the gate driving unit of the $(7+8\ k)^{th}$ stage receives the third clock signal, a third clock signal end of the gate driving unit of the $(7+8\ k)^{th}$ stage receives the seventh clock signal, and a fourth clock signal end of the gate driving unit of the $(7+8\ k)^{th}$ stage receives the fifth clock signal; in the cascaded gate driving units of even stages, a first clock signal end of the gate driving unit of a $(2+8\ k)^{th}$ stage receives the fourth clock signal, a second clock signal end of the gate driving unit of the $(2+8\ k)^{th}$ stage receives the sixth clock signal, a third clock signal end of the gate driving unit of the $(2+8\ k)^{th}$ stage receives the second clock signal, and a fourth clock signal end of the gate driving unit of the $(2+8\ k)^{th}$ stage receives the eighth clock signal; a first clock signal end of the gate driving unit of a $(4+8\ k)^{th}$ stage receives the sixth clock signal, a second clock signal end of the gate driving unit of the $(4+8\ k)^{th}$ stage receives the eighth clock signal, a third clock signal end of the gate driving unit of the $(4+8\ k)^{th}$ stage receives the fourth clock signal, and a fourth clock signal end of the gate driving unit of the $(4+8\ k)^{th}$ stage receives the second clock signal; a first clock signal end CKa of the gate driving unit of a $(6+8\ k)^{th}$ stage receives the eighth clock signal, a second clock signal end of the gate driving unit of the $(6+8\ k)^{th}$ stage receives the second clock signal, a third clock signal end of the gate driving unit of the $(6+8\ k)^{th}$ stage receives the sixth clock signal, and a fourth clock signal end CKd of the gate driving unit of the $(6+8\ k)^{th}$ stage receives the fourth clock signal; and a first clock signal end of the gate driving unit of an $(8+8\ k)^{th}$ stage receives the second clock signal, a second clock signal end of the gate driving unit of the $(8+8\ k)^{th}$ stage receives the fourth clock signal, a third clock signal end of the gate driving unit of the $(8+8\ k)^{th}$ stage receives the eighth clock signal, and a fourth clock signal end of the gate driving unit of the $(8+8\ k)^{th}$ stage receives the sixth clock signal, where k is an integer larger than or equal to 0.

Optionally, the gate driving circuit is fed with a first clock signal, a second clock signal, a third clock signal, and a fourth clock signal.

Optionally, each of the gate driving unit is electrically connected to a first clock signal end, a second clock signal end, a third clock signal end, and a fourth clock signal end; a first clock signal end of the gate driving unit of a $(1+4\ k)^{th}$ stage receives the second clock signal, a second clock signal end of the gate driving unit of the $(1+4\ k)^{th}$ stage receives the third clock signal, a third clock signal end of the gate driving unit of the $(1+4\ k)^{th}$ stage receives the first clock signal, and a fourth clock signal end of the gate driving unit of the $(1+4\ k)^{th}$ stage receives the fourth clock signal; a first clock signal end of the gate driving unit of a $(2+4\ k)^{th}$ stage receives the third clock signal, a second clock signal end of the gate driving unit of the $(2+4\ k)^{th}$ stage receives the fourth clock signal, a third clock signal end of the gate driving unit of the $(2+4\ k)^{th}$ stage receives the second clock signal, and a fourth clock signal end of the gate driving unit of the $(2+4\ k)^{th}$ stage receives the first clock signal; a first clock signal end of the gate driving unit of a $(3+4\ k)^{th}$ stage receives the fourth clock signal, a second clock signal end of the gate driving unit of the $(3+4\ k)^{th}$ stage receives the first clock signal, a third clock signal end of the gate driving unit of the $(3+4\ k)^{th}$ stage receives the third clock signal, and a fourth clock signal end of the gate driving unit of the $(3+4\ k)^{th}$ stage receives the second clock signal; a first clock signal end of the gate driving unit of a $(4+4\ k)^{th}$ stage receives the first clock signal, a second clock signal end of the gate driving unit of the $(4+4\ k)^{th}$ stage receives the second clock signal, a third clock signal end of the gate driving unit of the $(4+4\ k)^{th}$ stage receives the fourth clock signal, and a fourth clock signal end of the gate driving unit of the $(4+4\ k)^{th}$ stage receives the third clock signal, where k is an integer larger than or equal to 0.

Optionally, a driving sequence of the gate driving circuit comprises: a charging phase, for charging the first node; an output phase, for the scan signal output end of the gate driving unit of the current stage to output a scan signal of the gate driving unit of the current stage; a pull-down phase, for pulling down the voltage level of the first node and the voltage level of the scan signal output end of the gate driving unit of the current stage; and a maintaining phase, for maintaining the voltage level of the first node and the voltage level of the scan signal output end of the gate driving unit of the current stage and periodically pulling down the voltage level of the second node.

Optionally, the maintaining phase comprises a first maintaining phase and a second maintaining phase; the gate driving circuit is further electrically connected to a fourth clock signal end; the fourth clock signal end receives a high voltage level signal to pull up the voltage level of the second node in the first maintaining phase; and the first clock signal end receives the high voltage level signal to pull down the voltage level of the second node to periodically pull down the voltage level of the second node.

According to an embodiment of the present disclosure, a gate driving circuit comprising a plurality of cascaded gate driving units is provided. Each of the driving units comprises: a first transistor, having a gate electrically connected to a second clock signal end, a first electrode electrically connected to a scan signal output end of a previous stage, and a second electrode electrically connected to the first node; a second transistor, having a gate electrically connected to the first node, a first electrode electrically connected to a third clock signal end, and a second electrode electrically connected to the scan signal output end of the gate driving unit of a current stage; a third transistor, having a gate electrically connected to a second clock signal end, a first electrode receiving a constant low voltage level signal, and a second electrode electrically connected to the scan signal output end of the gate driving unit of the current stage; a fourth transistor, having a gate electrically connected to the first clock signal end, a first electrode receiving a constant low voltage level signal, and a second electrode electrically connected to the second node; a fifth transistor, having a gate electrically connected to the second node, a first electrode receiving the constant low voltage level signal, and a second electrode electrically connected to the first node; a sixth transistor, having a gate electrically connected to the first node, a first electrode receiving the constant low voltage level signal, and a second electrode electrically connected to the second node; a seventh transistor, having a gate electrically connected to a fourth clock signal end, a first electrode electrically connected to the fourth clock signal end, and a second electrode electrically connected to the second node; and an eighth transistor, having a gate electrically connected to the second node, a first electrode receiving the constant low voltage level signal, and a second electrode electrically connected to the scan signal output end of the gate driving unit of the current stage.

Optionally, the gate driving circuit further comprises: a ninth transistor, having a gate receiving the reset signal, a first electrode receiving the constant low voltage signal, and a second electrode electrically connected to the second node; and a tenth transistor, having a gate receiving the reset signal, a first electrode receiving the constant low voltage signal, and a second electrode electrically connected to the first node.

Optionally, a driving sequence of the gate driving circuit comprises: a charging phase, for charging the first node; an output phase, for the scan signal output end of the gate driving unit of the current stage to output a scan signal; a pull-down phase, for pulling down the voltage level of the first node and the voltage level of the scan signal output end of the gate driving unit of the current stage; and a maintaining phase, for maintaining the voltage level of the first node and the voltage level of the scan signal output end of the gate driving unit of the current stage and periodically pulling down the voltage level of the second node.

Optionally, the maintaining phase comprises a first maintaining phase and a second maintaining phase; the gate driving circuit is further electrically connected to a fourth clock signal end; the fourth clock signal end receives a high voltage level signal to pull up the voltage level of the second node in the first maintaining phase; and the first clock signal end receives the high voltage level signal to pull down the voltage level of the second node to periodically pull down the voltage level of the second node.

According to an embodiment of the present disclosure, a display panel is disclosed. The display panel comprises the above-mentioned gate driving circuit.

According to an embodiment of the present disclosure, the gate driving circuit utilizes the pull-down control module to periodically pull up and pull down the voltage level of the second node. In this way, the voltage level of the second node is periodically a high voltage level. This effectively reduces the time duration when the second node corresponds to the high voltage level. Thus, after the TFTs electrically connected to the second node are forward biased, the TFTs could have sufficient recovery time. This solution effectively improves the bias condition of the TFTs in the pull-down control module and thus makes the circuit more stable and reliable. In addition, the display panel could have a reduced number of the TFTs in the gate driving unit and thus could have a narrower side frame.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

In the following embodiments, the transistors could be TFTs, filed effect transistors (FET) or any other devices having similar characteristics. Here, one of the source and the drain of the transistor is called “first electrode” and the other of the source and the drain is called “second electrode” because the source and the drain are symmetric and thus the first electrode and the second electrode could be interchangeable. In the following embodiments, in order to distinguish the two electrodes other than the gate, when the source is called the first electrode, the drain is called the second electrode. Or, when the drain is called the first electrode, the source is called the second electrode. In addition, as shown in the figures, the middle end of the switch transistor is the gate, the signal input end is the first electrode and the signal output end is the second electrode. Furthermore, the transistors in the following embodiments could comprise P-type transistors and/or N-type transistors. Here, the P-type transistor is turned on when a low voltage is applied on the gate and is turned off when a high voltage is applied on the gate. In contrast, the N-type transistor is turned on when a high voltage is applied on the gate and is turned off when a low voltage is applied on the gate.

The present application provides a gate driving circuit and a display panel. In the following disclosure, embodiments will be orderly explained but the explanation order does not represent any preference of the embodiments.

The present application provides a gate driving circuit. The gate driving circuit comprises a plurality of cascaded gate driving units. The $n^{th}$-stage gate driving unit is used to output the $n^{th}$-stage scan driving signal to charge the $n^{th}$ scan line of the display area such that the display panel could normally display an image.

Figure 1:
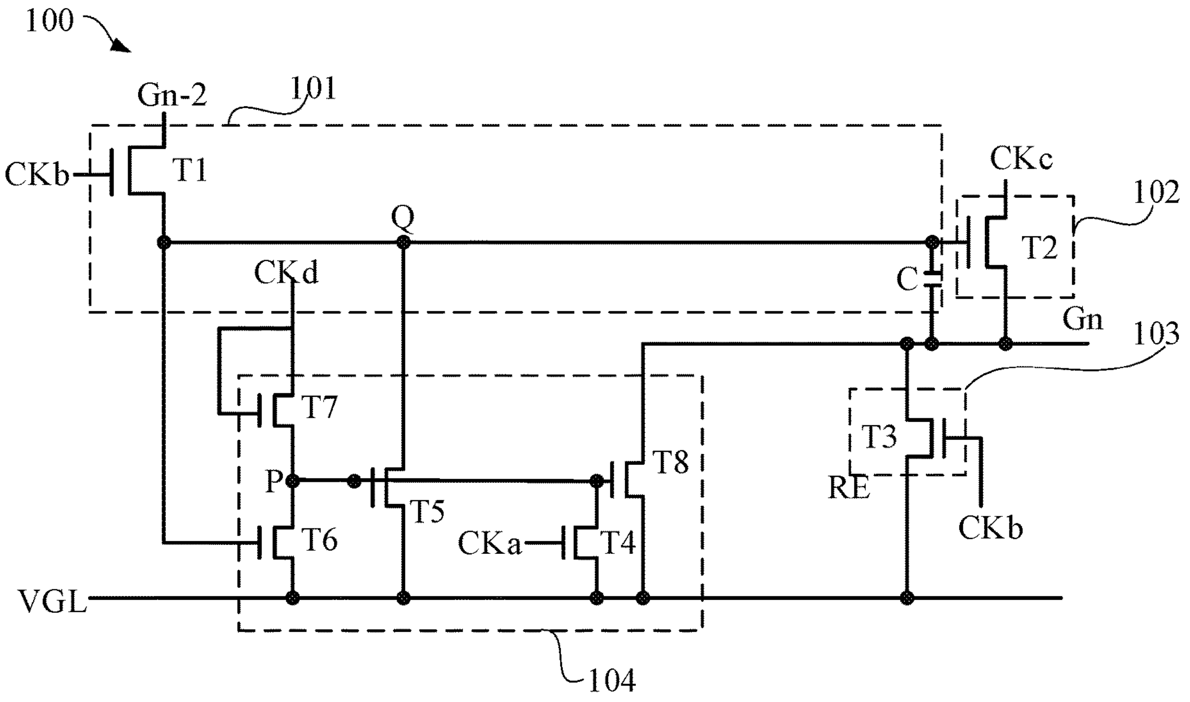
FIG. 1 is a diagram of a gate driving unit in a gate driving circuit according to a first embodiment of the present disclosure.

Please refer to FIG. 1. FIG. 1 is a diagram of a gate driving unit in a gate driving circuit according to a first embodiment of the present disclosure. The gate driving unit of each stage 100 comprises a pull-up control module 101, a pull-up module 102, a pull-down module 103 and a pull-down control module 104. The pull-up control module 101 is electrically connected to a first node Q. The pull-up control module 101 is configured to control the voltage level of the first node Q. The pull-up module 102 is electrically connected to the first node Q and a scan signal output end Gn of a current stage. The pull-up module 102 is configured to pull up a voltage level of the scan signal output end Gn of the gate driving unit of the current stage under a control of the voltage level of the first node Q. The pull-down module 103 is electrically connected to the scan signal output end Gn of the gate driving unit of the current stage. The pull-down module 103 is configured to pull down the voltage level of the scan signal output end Gn of the gate driving unit of the current stage. The pull-down control module 104 is electrically connected to a second node P, the first node Q, a first clock signal end CKa and the scan signal output end Gn of the gate driving unit of the current stage. The pull-down control module 104 is configured to periodically pull down a voltage level of the second node P under a control of an input signal of the first clock signal end CKa to maintain the voltage level of the first node Q and the voltage level of the scan signal output end Gn of the gate driving unit of the current stage.

In this embodiment, the pull-down control module 104 of the gate driving unit 100 could periodically pull down the voltage level of the second node P under the control of the signal of the first clock signal end CKa such that the time duration when the second node P corresponds to the high voltage level is reduced. This reduces the bias applied on the TFTs in the pull-down control module 104 and thus raises the stability of the gate driving circuit.

The pull-up control module 101 comprises a first transistor T1 and a bootstrap capacitor C. The first transistor T1 has a gate electrically connected to a second clock signal end CKb, a first electrode electrically connected to a scan signal output end G(n−2) of a previous stage, and a second electrode electrically connected to the first node Q. One end of the bootstrap capacitor C is electrically connected to the first node Q and the other end of the bootstrap capacitor C is electrically connected to the scan signal output end Gn of the current stage. When the gate driving unit 100 is the gate driving unit of the first stage, the scan signal output end G(n−2) of the previous stage receives a start signal to trigger the gate driving unit 100 of the GOA unit to output the scan driving signal.

The pull-up module 102 comprises a second transistor T2. The second transistor T2 has a gate electrically connected to the first node Q, a first electrode electrically connected to a third clock signal end CKc, and a second electrode electrically connected to the scan signal output end Gn of the current stage.

The pull-down module 103 comprises a third transistor T3. The third transistor T3 has a gate electrically connected to a second clock signal end CKb, a first electrode receiving a constant low voltage level signal VGL, and a second electrode electrically connected to the scan signal output end Gn of the current stage.

The pull-down control module 104 comprises a fourth transistor T4, a fifth transistor T5, a sixth transistor T6, a seventh transistor T7 and an eighth transistor T8. The fourth transistor has a gate electrically connected to the first clock signal end CKa, a first electrode receiving the constant low voltage level signal VGL, and a second electrode electrically connected to the second node P. The fifth transistor T5 has a gate electrically connected to the second node P, a first electrode receiving the constant low voltage level signal VGL, and a second electrode electrically connected to the first node Q. The sixth transistor T6 has a gate electrically connected to the first node Q, a first electrode receiving the constant low voltage level signal VGL, and a second electrode electrically connected to the second node P. The seventh transistor T7 has a gate electrically connected to a fourth clock signal end CKd, a first electrode electrically connected to the fourth clock signal end CKd, and a second electrode electrically connected to the second node P. The eighth transistor T8 has a gate electrically connected to the second node P, a first electrode receiving the constant low voltage level signal VGL, and a second electrode electrically connected to the scan signal output end Gn of the current stage.

The gate driving unit 100 utilizes the pull-down control module 104 to increase the signal at the first clock signal end CKa to control the voltage level of the second node P. That is, the time duration when the second node P corresponds to the high voltage level is reduced such that the biases applied on the fifth transistor T5 and the eighth transistor T8 are reduced such that the stability of the circuit is raised.

Figure 2:
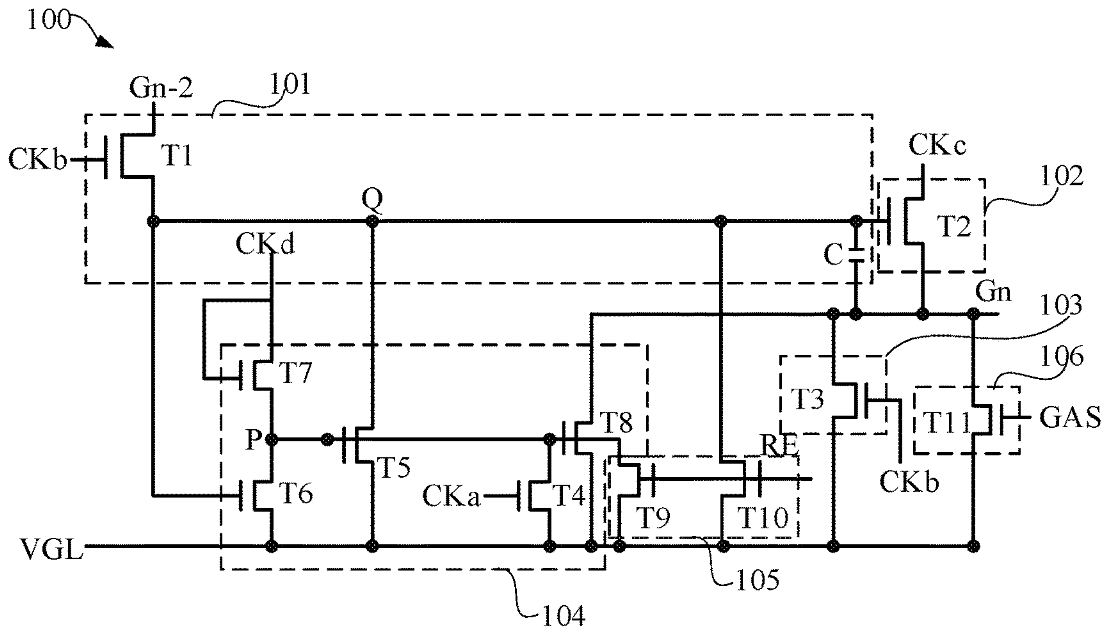
FIG. 2 is a diagram of a gate driving unit in a gate driving circuit according to a second embodiment of the present disclosure.

Please refer to FIG. 2. FIG. 2 is a diagram of a gate driving unit in a gate driving circuit according to a second embodiment of the present disclosure. As shown in FIG. 2, the gate driving unit 100 further comprises a reset module 105. The reset module receives the reset signal RE and the constant low voltage signal VGL and is electrically connected to the first node Q and the second node P to reset the voltage levels of the first node Q and the second node P.

The reset module 105 comprises a ninth transistor T9 and a tenth transistor T10. The ninth transistor T9 has a gate receiving the reset signal RE, a first electrode receiving the constant low voltage signal VGL, and a second electrode electrically connected to the second node P. The tenth transistor T10 has a gate receiving the reset signal RE, a first electrode receiving the constant low voltage signal VGL, and a second electrode electrically connected to the first node Q.

Please refer to FIG. 2 again. As shown in FIG. 2, the gate driving unit 100 further comprises a global switch control module 106. The global switch control module 106 receives a global switch control signal GAS and the constant low voltage level signal VGL and electrically connected to the scan signal output end Gn of the current stage. The global switch control module 106 is configured to simultaneously control the voltage level of the scan signal output end of each of the gate driving units 100 according to the global switch control signal GAS and the constant low voltage level signal VGL.

The global switch control module 106 comprises: an eleventh transistor T11. The eleventh transistor T11 has a gate receiving the global switch control signal GAS, a first electrode receiving the constant low voltage signal VGL, and a second electrode electrically connected to the scan signal output end Gn of the current stage.

The gate driving circuit could drive the panel from both sides or only one side. These changes all fall within the scope of the present application.

Figure 3:
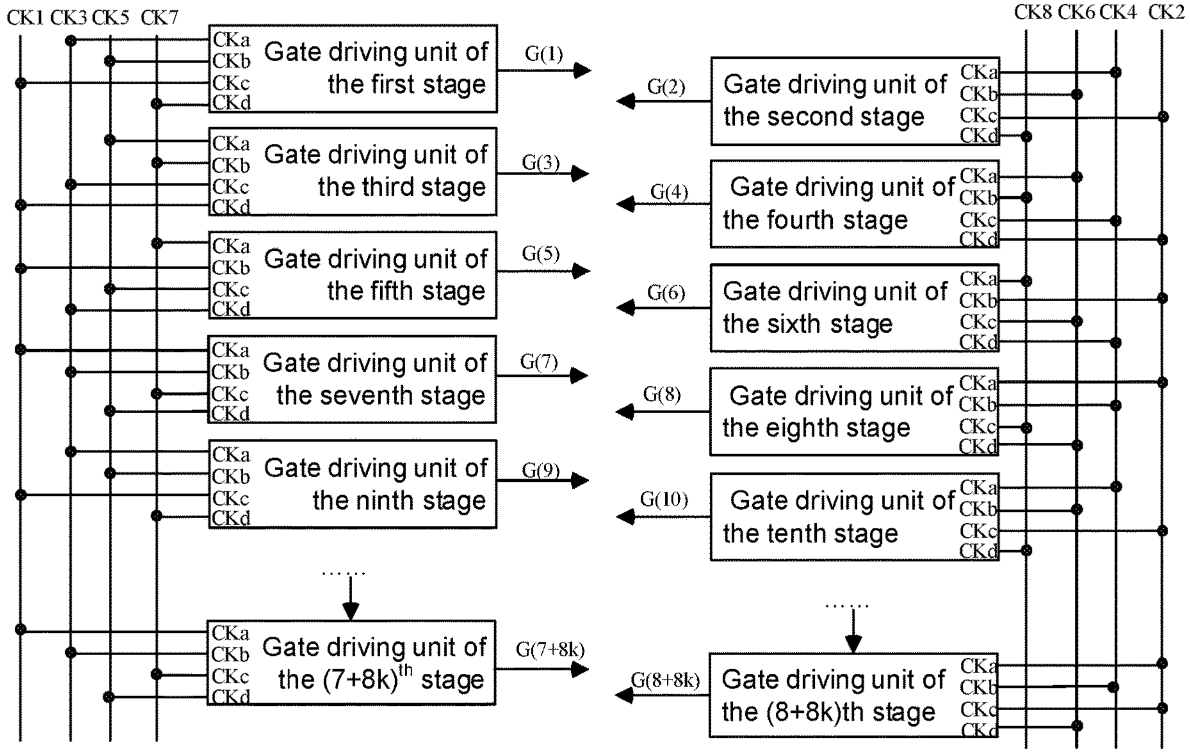
FIG. 3 is a diagram of a gate driving circuit according to a first embodiment of the present disclosure.

Please refer to FIG. 3. FIG. 3 is a diagram of a gate driving circuit according to a first embodiment of the present disclosure. In this embodiment, the gate driving circuit receives a first clock signal CK1, a second clock signal CK2, a third clock signal CK3, a fourth clock signal CK4, a fifth clock signal CK5, a sixth clock signal CK6, a seventh clock signal CK7 and an eighth clock signal CK8. The gate driving circuit comprises a plurality of cascaded gate driving units of odd stages and a plurality of cascaded gate driving units of even stages. The plurality of cascaded gate driving units of the odd stages receive the first clock signal CK1, the third clock signal CK3, the fifth clock signal CK5 and the seventh clock signal CK7. The plurality of cascaded gate driving units of the even stages receive the second clock signal CK2, the fourth clock signal CK4, the sixth clock signal CK6 and the eighth clock signal CK8.

The gate driving unit 100 of each stage is electrically connected to the first clock signal end CKa, the second clock signal end CKb, the third clock signal end CKc and the fourth clock signal end CKd.

In the cascaded gate driving units of odd stages, the first clock signal end CKa of the gate driving unit of the (1+8 k)$^{th}$ stage receives the third clock signal CK3. The second clock signal end CKb of the gate driving unit of the (1+8 k)$^{th}$ stage receives the fifth clock signal CK5. The third clock signal end CKc of the gate driving unit of the (1+8 k)$^{th}$ stage receives the first clock signal CK1. The fourth clock signal end CKd of the gate driving unit of the (1+8 k)$^{th}$ stage receives the seventh clock signal CK7.

The first clock signal end CKa of the gate driving unit of the (3+8 k)$^{th}$ stage receives the fifth clock signal CK5. The second clock signal end CKb of the gate driving unit of the (3+8 k)$^{th}$ stage receives the seventh clock signal CK7. The third clock signal end CKc of the gate driving unit of the (3+8 k)$^{th}$ stage receives the third clock signal CK3. The fourth clock signal end CKd of the gate driving unit of the (3+8 k)$^{th}$ stage receives the first clock signal CK1.

The first clock signal end CKa of the gate driving unit of the (5+8 k)$^{th}$ stage receives the seventh clock signal CK7. The second clock signal end CKb of the gate driving unit of the (5+8 k)$^{th}$ stage receives the first clock signal CK1. The third clock signal end CKc of the gate driving unit of the (5+8 k)$^{th}$ stage receives the fifth clock signal CK5. The fourth clock signal end CKd of the gate driving unit of the (5+8 k)$^{th}$ stage receives the third clock signal CK3.

The first clock signal end CKa of the gate driving unit of the (7+8 k)$^{th}$ stage receives the first clock signal CK1. The second clock signal end CKb of the gate driving unit of the (7+8 k)$^{th}$ stage receives the third clock signal CK3. The third clock signal end CKc of the gate driving unit of the (7+8 k)$^{th}$ stage receives the seventh clock signal CK7. The fourth clock signal end CKd of the gate driving unit of the (7+8 k)$^{th}$ stage receives the fifth clock signal CK5.

In the cascaded gate driving units of even stages, the first clock signal end CKa of the gate driving unit of the (2+8 k)$^{th}$ stage receives the fourth clock signal CK4. The second clock signal end CKb of the gate driving unit of the (2+8 k)$^{th}$ stage receives the sixth clock signal CK6. The third clock signal end CKc of the gate driving unit of the (2+8 k)$^{th}$ stage receives the second clock signal CK2. The fourth clock signal end CKd of the gate driving unit of the (2+8 k)$^{th}$ stage receives the eighth clock signal CK8.

The first clock signal end CKa of the gate driving unit of the (4+8 k)$^{th}$ stage receives the sixth clock signal CK6. The second clock signal end CKb of the gate driving unit of the (4+8 k)$^{th}$ stage receives the eighth clock signal CK8. The third clock signal end CKc of the gate driving unit of the (4+8 k)$^{th}$ stage receives the fourth clock signal CK4. The fourth clock signal end CKd of the gate driving unit of the (4+8 k)$^{th}$ stage receives the second clock signal CK2.

The first clock signal end CKa of the gate driving unit of the (6+8 k)$^{th}$ stage receives the eighth clock signal CK8. The second clock signal end CKb of the gate driving unit of the (6+8 k)$^{th}$ stage receives the second clock signal CK2. The third clock signal end CKc of the gate driving unit of the (6+8 k)$^{th}$ stage receives the sixth clock signal CK6. The fourth clock signal end CKd of the gate driving unit of the (6+8 k)$^{th}$ stage receives the fourth clock signal CK4.

The first clock signal end CKa of the gate driving unit of the (8+8 k)$^{th}$ stage receives the second clock signal CK2. The second clock signal end CKb of the gate driving unit of the (8+8 k)$^{th}$ stage receives the fourth clock signal CK4. The third clock signal end CKc of the gate driving unit of the (8+8 k)$^{th}$ stage receives the eighth clock signal CK8. The fourth clock signal end CKd of the gate driving unit of the (8+8 k)$^{th}$ stage receives the sixth clock signal CK6. Here, the number k is an integer larger than or equal to 0.

Figure 4:
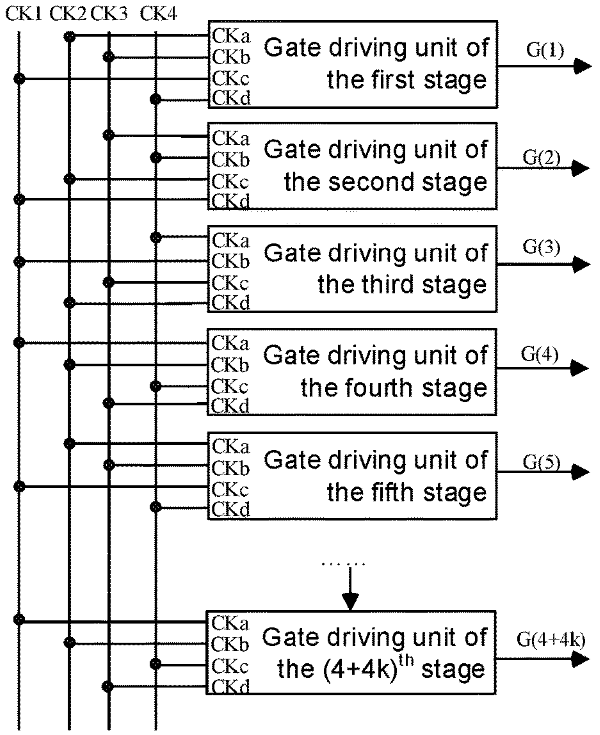
FIG. 4 is a diagram of a gate driving circuit according to a second embodiment of the present disclosure.

Please refer to FIG. 4. FIG. 4 is a diagram of a gate driving circuit according to a second embodiment of the present disclosure. In this embodiment, a plurality of cascaded gate driving units receive a first clock signal CK1, a second clock signal CK2, a third clock signal CK3, and a fourth clock signal CK4.

Each of the gate driving unit 100 is electrically connected to the first clock signal end CKa, the second clock signal end CKb, the third clock signal end CKc and the fourth clock signal end CKd.

The first clock signal end CKa of the gate driving unit of the (1+4 k)$^{th}$ stage receives the second clock signal CK2. The second clock signal end CKb of the gate driving unit of the (1+4 k)$^{th}$ stage receives the third clock signal CK3. The third clock signal end CKc of the gate driving unit of the (1+4 k)$^{th}$ stage receives the first clock signal CK1. The fourth clock signal end CKd of the gate driving unit of the (1+4 k)$^{th}$ stage receives the fourth clock signal CK4.

The first clock signal end CKa of the gate driving unit of the (2+4 k)$^{th}$ stage receives the third clock signal CK3. The second clock signal end CKb of the gate driving unit of the $(2+4\ k)^{th}$ stage receives the fourth clock signal CK4. The third clock signal end CKc of the gate driving unit of the $(2+4\ k)^{th}$ stage receives the second clock signal CK2. The fourth clock signal end CKd of the gate driving unit of the $(2+4\ k)^{th}$ stage receives the first clock signal CK1.

The first clock signal end CKa of the gate driving unit of the $(3+4\ k)^{th}$ stage receives the fourth clock signal CK4. The second clock signal end CKb of the gate driving unit of the $(3+4\ k)^{th}$ stage receives the first clock signal CK1. The third clock signal end CKc of the gate driving unit of the $(3+4\ k)^{th}$ stage receives the third clock signal CK3. The fourth clock signal end CKd of the gate driving unit of the $(3+4\ k)^{th}$ stage receives the second clock signal CK2.

The first clock signal end CKa of the gate driving unit of the $(4+4\ k)^{th}$ stage receives the first clock signal CK1. The second clock signal end CKb of the gate driving unit of the $(4+4\ k)^{th}$ stage receives the second clock signal CK2. The third clock signal end CKc of the gate driving unit of the $(4+4\ k)^{th}$ stage receives the fourth clock signal CK4. The fourth clock signal end CKd of the gate driving unit of the $(4+4\ k)^{th}$ stage receives the third clock signal CK3. Here, the number k is an integer larger than or equal to 0.

According to an embodiment, the driving sequence of the gate driving circuit comprises a charging phase, an output phase, a pull-down phase and a maintaining phase. In the charging phase, the first node is charged. In the output phase, the scan signal output end of the current stage outputs the scan signal of the current stage. In the pull-down phase, the voltage level of the first node and the voltage level of the scan signal output end of the current stage are pulled down. In the maintaining phase, the voltage level of the first node and the voltage level of the scan signal output end of the current stage are maintained and the voltage level of the second node is periodically pulled down.

The maintaining phase comprises a first maintaining phase and a second maintaining phase. In the first maintaining phase, the fourth clock signal end receives a high voltage level signal to pull up the voltage level of the second node. In the second maintaining phase, the first clock signal end receives the high voltage level signal to pull down the voltage level of the second node to periodically pull down the voltage level of the second node.

Figure 5:
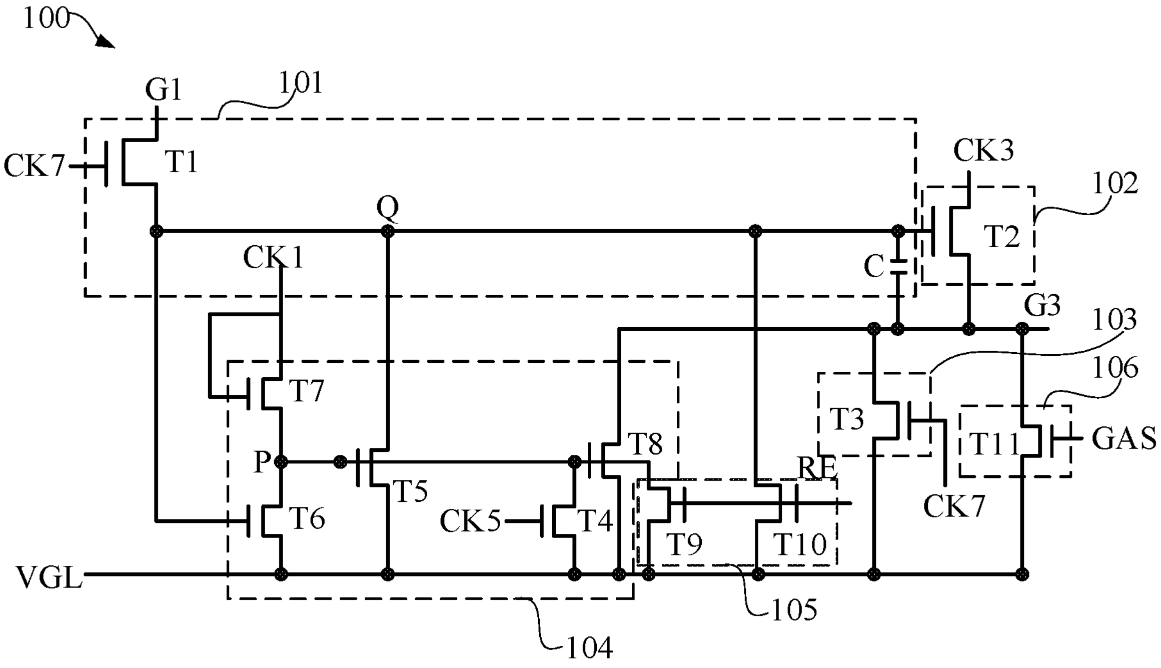
FIG. 5 is a diagram of a gate driving unit of the third stage in a gate driving circuit according to an embodiment of the present disclosure.
Figure 6:
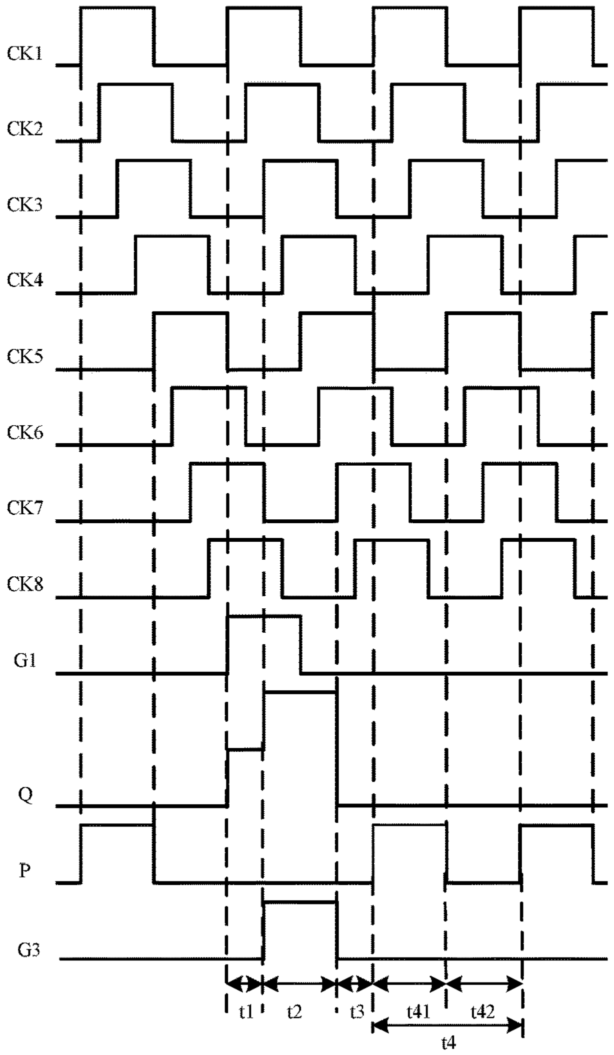
FIG. 6 is a timing diagram of the gate driving unit of the third stage in the gate driving circuit according to an embodiment of the present disclosure.

In the following disclosure, the gate driving unit of the third stage is taken as an example to illustrate the operations of the gate driving unit of the third stage of the gate driving circuit shown in FIG. 3. Please refer to FIG. 5 and FIG. 6. FIG. 5 is a diagram of a gate driving unit of the third stage in a gate driving circuit according to an embodiment of the present disclosure. FIG. 6 is a timing diagram of the gate driving unit of the third stage in the gate driving circuit according to an embodiment of the present disclosure. The first clock signal CK1, the second clock signal CK2, the third clock signal CK3, the fourth clock signal CK4, the fifth clock signal CK5, the sixth clock signal CK6, the seventh clock signal CK7 and the eighth clock signal CK8 are clock signals having the same period but phase differences.

In the gate driving unit 100 of the third stage, the first clock signal end CKa receives the fifth clock signal CK5, the second clock signal end CKb receives the seventh clock signal CK7, the third clock signal end CKc receives the third clock signal CK3 and the fourth clock signal end CKd receives the first clock signal CK1.

In the charging phase t1, the scan signal output end of the previous stage receives the scan signal G1 of the first stage. The scan signal G1 of the first stage and the seventh clock signal CK7 both correspond to the high voltage level and thus the first transistor T1 is turned on. The scan signal G1 of the first stage is transferred to the first node Q through the first transistor T1 and charges the bootstrap capacitor C such that the voltage level of the first node Q corresponds to the high voltage level. At this time, because the voltage level of the first node Q corresponds to the high voltage level, the second transistor T2 is turned on. At the same time, the third clock signal CK3 corresponds to the low voltage level. Accordingly, the scan signal output end G3 of the third stage corresponds to the low voltage level. Furthermore, the scan signal G1 of the first stage turns on the sixth transistor T6. The constant low voltage level signal VGL is transferred to the second node P through the sixth transistor T6 to pull down the voltage level of the second node P.

In the charging phase t1, the first clock signal CK1 also corresponds to the high voltage level. At this time, the first clock signal CK1 or the seventh transistor T7 need to be adjusted to make the current flowing through the seventh transistor T7 lower. Thus, the seventh transistor T7 is not turned on such that the circuit could be ensured to work normally.

In the outputting phase T2, because of the bootstrap capacitor C, the voltage level of the first node Q still corresponds to the high voltage level. The third clock signal CK3 corresponds to the high voltage level. The first node Q corresponds to the high voltage level and thus the second transistor T2 is turned on. The third clock signal CK3 is transferred to the scan signal output end G3 of the third stage through the second transistor T2. At this time, the voltage level of the scan signal output end G3 of the third stage corresponds to the high voltage level. At the same time, because of the coupling effect of the bootstrap capacitor C, the voltage level of the first node Q is pulled up such that the second transistor T2 is ensured to be turned on.

In the pull-down phase T3, the scan signal G1 of the first stage corresponds to the low voltage level and the seventh clock signal CK7 corresponds to the high voltage level. The third transistor T3 is turned on. The constant low voltage level VGL is transferred to the first node Q and the scan signal output end G3 of the third stage through the third transistor T3. At this time, the scan signal output end G3 of the third stage is pulled down to the voltage level of the constant low voltage level VGL.

In the maintaining phase t4, the first clock signal CL1 corresponds to the high voltage level and the seventh transistor T7 is turned on. The first clock signal CK1 is transferred to the second node P through the seventh transistor T7 to pull up the voltage level of the second node P. At the same time, because the voltage level of the node P corresponds to the high voltage level, the fifth transistor T5 and the eighth transistor T8 are turned on. The constant low voltage level is outputted to the first node Q. At this time, the first node Q and the scan signal output end G3 of the third stage maintain their low voltage.

The maintaining phase comprises the first maintaining phase t41 and the second maintaining phase t42. In the first maintaining phase t41, the first clock signal CK1 corresponds to the high voltage level and the seventh transistor T7 is turned on. The first clock signal CK1 is transferred to the second node P through the seventh transistor T7 to pull up the voltage level of the second node P. In the second maintaining phase t42, the fifth clock signal CK5 corresponds to the high voltage level and the fourth transistor T4 is turned on. The constant low voltage level signal VGL is transferred to the second node P through the fourth transistor T4 to pull down the voltage level of the second node P. Because the voltage level of the second node P is pulled down in the second maintaining phase t42, the voltage level of the second node P is periodically corresponding to the high voltage level. In this way, the time duration when the high voltage level is applied to the fifth transistor T5 and the eighth transistor T8 becomes shorter. This effectively reduces the bias applied to the fifth transistor T5 and the eighth transistor T8 and thus the stability of the circuit is raised.

In this embodiment, the first maintaining phase t41 and the second maintaining phase t42 could be both set as a half of the maintaining phase t4. This could reduce the bias applied to the fifth transistor T5 and the eighth transistor T8 under the condition that the circuit is ensured to work normally. In another embodiment, the first maintaining phase t41 and the second maintaining phase t42 could have different ratios. These changes all fall within the scope of the present application.

According to an embodiment, the pull-down control module 104 is used to periodically pull up and pull down the voltage level of the second node P such that the voltage level of the second node P periodically corresponds to the high voltage level. This effectively reduces the time duration when the voltage level of the second node P corresponds to the high voltage level. Thus, the fifth transistor T5 and the eighth transistor T8 could have enough recovery time after they are forward biased. This reduces the bias applied to the TFTs in the pull-down control module 104 and makes the circuit more stable and reliable.

Figure 7:
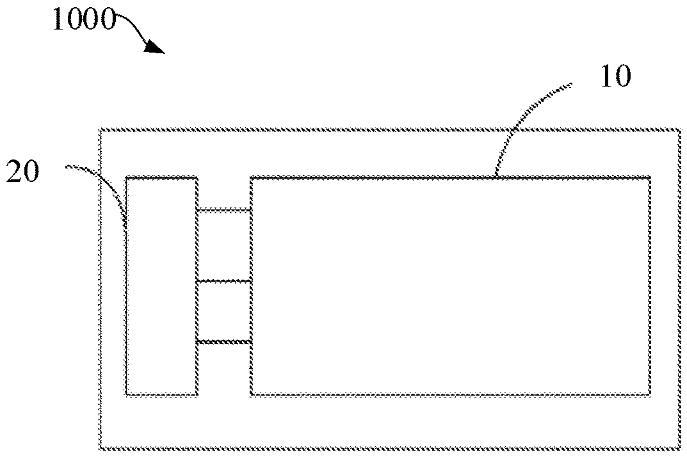
FIG. 7 is a diagram of a display panel according to an embodiment of the present disclosure.

According to an embodiment, a display panel is disclosed. The display panel comprises the above-mentioned driving circuit. Please refer to FIG. 7. FIG. 7 is a diagram of a display panel according to an embodiment of the present disclosure. The display panel 1000 comprises a display area 10 and gate driving circuit 20 integrated in the edge of the display area 10. The gate driving circuit 20 has similar structures and operations of the above-mentioned gate driving circuit and thus further illustration is omitted here.

According to an embodiment of the present disclosure, the display panel comprises a gate driving circuit. The gate driving circuit utilizes the pull-down control module to periodically pull up and pull down the voltage level of the second node. In this way, the voltage level of the second node is periodically a high voltage level. This effectively reduces the time duration when the second node corresponds to the high voltage level. Thus, after the TFTs electrically connected to the second node are forward biased, the TFTs could have sufficient recovery time. This solution effectively improves the bias condition of the TFTs in the pull-down control module and thus makes the circuit more stable and raises the reliability of the circuit. In addition, the display panel 1000 could have a reduced number of the TFTs in the gate driving unit and thus could have a narrower side frame.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A gate driving circuit, comprising a plurality of cascaded gate driving units, each of the driving units comprising:

- a pull-up control module, electrically connected to a first node, configured to control a voltage level of the first node;
- a pull-up module, electrically connected to the first node and a scan signal output end of a current stage, configured to pull up a voltage level of the scan signal output end of the gate driving unit of a current stage under a control of the voltage level of the first node;
- a pull-down module, electrically connected to the scan signal output end of the gate driving unit of the gate driving unit of the current stage, configured to pull down the voltage level of the scan signal output end of the gate driving unit of the current stage; and
- a pull-down control module, electrically connected to a second node, the first node, a first clock signal end and the scan signal output end of the gate driving unit of the current stage, configured to periodically pull down a voltage level of the second node under a control of an input signal of the first clock signal end to maintain the voltage level of the first node and the voltage level of the scan signal output end of the gate driving unit of the current stage.

2. The gate driving circuit of claim 1, wherein the pull-up control module comprises:

- a first transistor, having a gate electrically connected to a second clock signal end, a first electrode electrically connected to a scan signal output end of a previous stage, and a second electrode electrically connected to the first node; and
- a bootstrap capacitor, electrically connected to the first node and the scan signal output end of the gate driving unit of the current stage.

3. The gate driving circuit of claim 1, wherein the pull-up module comprises:

- a second transistor, having a gate electrically connected to the first node, a first electrode electrically connected to a third clock signal end, and a second electrode electrically connected to the scan signal output end of the gate driving unit of the current stage.

4. The gate driving circuit of claim 1, wherein the pull-down module comprises:

- a third transistor, having a gate electrically connected to a second clock signal end, a first electrode receiving a constant low voltage level signal, and a second electrode electrically connected to the scan signal output end of the gate driving unit of the current stage.

5. The gate driving circuit of claim 1, wherein the pull-down control module comprises:

- a fourth transistor, having a gate electrically connected to the first clock signal end, a first electrode receiving a constant low voltage level signal, and a second electrode electrically connected to the second node;
- a fifth transistor, having a gate electrically connected to the second node, a first electrode receiving the constant low voltage level signal, and a second electrode electrically connected to the first node;
- a sixth transistor, having a gate electrically connected to the first node, a first electrode receiving the constant low voltage level signal, and a second electrode electrically connected to the second node;
- a seventh transistor, having a gate electrically connected to a fourth clock signal end, a first electrode electrically connected to the fourth clock signal end, and a second electrode electrically connected to the second node; and
- an eighth transistor, having a gate electrically connected to the second node, a first electrode receiving the constant low voltage level signal, and a second electrode electrically connected to the scan signal output end of the gate driving unit of the current stage.

6. The gate driving circuit of claim 1, further comprising:

- a reset module, receiving a reset signal and a constant low voltage signal and electrically connected to the first node and the second node, configured to reset the voltage level of the first node and the voltage level of the second node.

7. The gate driving circuit of claim 6, wherein the reset module comprises:

a ninth transistor, having a gate receiving the reset signal, a first electrode receiving the constant low voltage signal, and a second electrode electrically connected to the second node; and a tenth transistor, having a gate receiving the reset signal, a first electrode receiving the constant low voltage signal, and a second electrode electrically connected to the first node.

8. The gate driving circuit of claim 1, further comprising:

a global switch control module, receiving a global switch control signal and a constant low voltage level signal and electrically connected to the scan signal output end of the gate driving unit of the current stage, configured to simultaneously control the voltage level of the scan signal output end of each of the gate driving units according to the global switch control signal and the constant low voltage level signal.

9. The gate driving circuit of claim 8, wherein the global switch control module comprises:

an eleventh transistor, having a gate receiving the global switch control signal, a first electrode receiving the constant low voltage signal, and a second electrode electrically connected to the scan signal output end of the gate driving unit of the current stage.

10. The gate driving circuit of claim 1, wherein the gate driving circuit receives a first clock signal, a second clock signal, a third clock signal, a fourth clock signal, a fifth clock signal, a sixth clock signal, a seventh clock signal and an eighth clock signal; the gate driving circuit comprises a plurality of cascaded gate driving units of odd stages and a plurality of cascaded gate driving units of even stages; the plurality of cascaded gate driving units of the odd stages receive the first clock signal, the third clock signal, the fifth clock signal and the seventh clock signal; and the plurality of cascaded gate driving units of the even stages receive the second clock signal, the fourth clock signal, the sixth clock signal and the eighth clock signal.

11. The gate driving circuit of claim 10, wherein the gate driving unit of each stage is electrically connected to a second clock signal end, a third clock signal end, and a fourth clock signal end;

in the cascaded gate driving units of odd stages, a first clock signal end of the gate driving unit of a $(1+8\text{ k})^{th}$ stage receives the third clock signal, a second clock signal end of the gate driving unit of the $(1+8\text{ k})^{th}$ stage receives the fifth clock signal, a third clock signal end of the gate driving unit of the $(1+8\text{ k})^{th}$ stage receives the first clock signal, and a fourth clock signal end of the gate driving unit of the $(1+8\text{ k})^{th}$ stage receives the seventh clock signal;

a first clock signal end of the gate driving unit of a $(3+8\text{ k})^{th}$ stage receives the fifth clock signal, a second clock signal end of the gate driving unit of the $(3+8\text{ k})^{th}$ stage receives the seventh clock signal, a third clock signal end of the gate driving unit of the $(3+8\text{ k})^{th}$ stage receives the third clock signal, and a fourth clock signal end of the gate driving unit of the $(3+8\text{ k})^{th}$ stage receives the first clock signal;

a first clock signal end of the gate driving unit of a $(5+8\text{ k})^{th}$ stage receives the seventh clock signal, a second clock signal end of the gate driving unit of the $(5+8\text{ k})^{th}$ stage receives the first clock signal, a third clock signal end of the gate driving unit of the $(5+8\text{ k})^{th}$ stage receives the fifth clock signal, and a fourth clock signal end of the gate driving unit of the $(5+8\text{ k})^{th}$ stage receives the third clock signal;

a first clock signal end of the gate driving unit of a $(7+8\text{ k})^{th}$ stage receives the first clock signal, a second clock signal end of the gate driving unit of the $(7+8\text{ k})^{th}$ stage receives the third clock signal, a third clock signal end of the gate driving unit of the $(7+8\text{ k})^{th}$ stage receives the seventh clock signal, and a fourth clock signal end of the gate driving unit of the $(7+8\text{ k})^{th}$ stage receives the fifth clock signal;

in the cascaded gate driving units of even stages, a first clock signal end of the gate driving unit of a $(2+8\text{ k})^{th}$ stage receives the fourth clock signal, a second clock signal end of the gate driving unit of the $(2+8\text{ k})^{th}$ stage receives the sixth clock signal, a third clock signal end of the gate driving unit of the $(2+8\text{ k})^{th}$ stage receives the second clock signal, and a fourth clock signal end of the gate driving unit of the $(2+8\text{ k})^{th}$ stage receives the eighth clock signal;

a first clock signal end of the gate driving unit of a $(4+8\text{ k})^{th}$ stage receives the sixth clock signal, a second clock signal end of the gate driving unit of the $(4+8\text{ k})^{th}$ stage receives the eighth clock signal, a third clock signal end of the gate driving unit of the $(4+8\text{ k})^{th}$ stage receives the fourth clock signal, and a fourth clock signal end of the gate driving unit of the $(4+8\text{ k})^{th}$ stage receives the second clock signal;

a first clock signal end CKa of the gate driving unit of a $(6+8\text{ k})^{th}$ stage receives the eighth clock signal, a second clock signal end of the gate driving unit of the $(6+8\text{ k})^{th}$ stage receives the second clock signal, a third clock signal end of the gate driving unit of the $(6+8\text{ k})^{th}$ stage receives the sixth clock signal, and a fourth clock signal end CKd of the gate driving unit of the $(6+8\text{ k})^{th}$ stage receives the fourth clock signal; and a first clock signal end of the gate driving unit of an $(8+8\text{ k})^{th}$ stage receives the second clock signal, a second clock signal end of the gate driving unit of the $(8+8\text{ k})^{th}$ stage receives the fourth clock signal, a third clock signal end of the gate driving unit of the $(8+8\text{ k})^{th}$ stage receives the eighth clock signal, and a fourth clock signal end of the gate driving unit of the $(8+8\text{ k})^{th}$ stage receives the sixth clock signal, where k is an integer larger than or equal to 0.

12. The gate driving circuit of claim 1, wherein the gate driving circuit is fed with a first clock signal, a second clock signal, a third clock signal, and a fourth clock signal.

13. The gate driving circuit of claim 12, wherein each of the gate driving unit is electrically connected to a first clock signal end, a second clock signal end, a third clock signal end, and a fourth clock signal end;

a first clock signal end of the gate driving unit of a $(1+4\text{ k})^{th}$ stage receives the second clock signal, a second clock signal end of the gate driving unit of the $(1+4\text{ k})^{th}$ stage receives the third clock signal, a third clock signal end of the gate driving unit of the $(1+4\text{ k})^{th}$ stage receives the first clock signal, and a fourth clock signal end of the gate driving unit of the $(1+4\text{ k})^{th}$ stage receives the fourth clock signal;

a first clock signal end of the gate driving unit of a $(2+4\text{ k})^{th}$ stage receives the third clock signal, a second clock signal end of the gate driving unit of the $(2+4\text{ k})^{th}$ stage receives the fourth clock signal, a third clock signal end of the gate driving unit of the $(2+4\text{ k})^{th}$ stage receives the second clock signal, and a fourth clock signal end of the gate driving unit of the (2+4 k)$^{th}$ stage receives the first clock signal;

a first clock signal end of the gate driving unit of a (3+4 k)$^{th}$ stage receives the fourth clock signal, a second clock signal end of the gate driving unit of the (3+4 k)$^{th}$ stage receives the first clock signal, a third clock signal end of the gate driving unit of the (3+4 k)$^{th}$ stage receives the third clock signal, and a fourth clock signal end of the gate driving unit of the (3+4 k)$^{th}$ stage receives the second clock signal;

a first clock signal end of the gate driving unit of a (4+4 k)$^{th}$ stage receives the first clock signal, a second clock signal end of the gate driving unit of the (4+4 k)$^{th}$ stage receives the second clock signal, a third clock signal end of the gate driving unit of the (4+4 k)$^{th}$ stage receives the fourth clock signal, and a fourth clock signal end of the gate driving unit of the (4+4 k)$^{th}$ stage receives the third clock signal, where k is an integer larger than or equal to 0.

14. The gate driving circuit of claim 1, wherein a driving sequence of the gate driving circuit comprises:

a charging phase, for charging the first node;

an output phase, for the scan signal output end of the gate driving unit of the current stage to output a scan signal of the gate driving unit of the current stage;

a pull-down phase, for pulling down the voltage level of the first node and the voltage level of the scan signal output end of the gate driving unit of the current stage; and a maintaining phase, for maintaining the voltage level of the first node and the voltage level of the scan signal output end of the gate driving unit of the current stage and periodically pulling down the voltage level of the second node.

15. The gate driving circuit of claim 14, wherein the maintaining phase comprises a first maintaining phase and a second maintaining phase; the gate driving circuit is further electrically connected to a fourth clock signal end; the fourth clock signal end receives a high voltage level signal to pull up the voltage level of the second node in the first maintaining phase; and the first clock signal end receives the high voltage level signal to pull down the voltage level of the second node to periodically pull down the voltage level of the second node.

16. A gate driving circuit, comprising a plurality of cascaded gate driving units, each of the driving units comprising:

a first transistor, having a gate electrically connected to a second clock signal end, a first electrode electrically connected to a scan signal output end of a previous stage, and a second electrode electrically connected to the first node;

a second transistor, having a gate electrically connected to the first node, a first electrode electrically connected to a third clock signal end, and a second electrode electrically connected to the scan signal output end of the gate driving unit of a current stage;

a third transistor, having a gate electrically connected to a second clock signal end, a first electrode receiving a constant low voltage level signal, and a second electrode electrically connected to the scan signal output end of the gate driving unit of the current stage;

a fourth transistor, having a gate electrically connected to the first clock signal end, a first electrode receiving a constant low voltage level signal, and a second electrode electrically connected to the second node;

a fifth transistor, having a gate electrically connected to the second node, a first electrode receiving the constant low voltage level signal, and a second electrode electrically connected to the first node;

a sixth transistor, having a gate electrically connected to the first node, a first electrode receiving the constant low voltage level signal, and a second electrode electrically connected to the second node;

a seventh transistor, having a gate electrically connected to a fourth clock signal end, a first electrode electrically connected to the fourth clock signal end, and a second electrode electrically connected to the second node; and an eighth transistor, having a gate electrically connected to the second node, a first electrode receiving the constant low voltage level signal, and a second electrode electrically connected to the scan signal output end of the gate driving unit of the current stage.

17. The gate driving circuit of claim 16, further comprising:

a ninth transistor, having a gate receiving the reset signal, a first electrode receiving the constant low voltage signal, and a second electrode electrically connected to the second node; and a tenth transistor, having a gate receiving the reset signal, a first electrode receiving the constant low voltage signal, and a second electrode electrically connected to the first node.

18. The gate driving circuit of claim 16, wherein a driving sequence of the gate driving circuit comprises:

a charging phase, for charging the first node;

an output phase, for the scan signal output end of the gate driving unit of the current stage to output a scan signal;

a pull-down phase, for pulling down the voltage level of the first node and the voltage level of the scan signal output end of the gate driving unit of the current stage; and a maintaining phase, for maintaining the voltage level of the first node and the voltage level of the scan signal output end of the gate driving unit of the current stage and periodically pulling down the voltage level of the second node.

19. The gate driving circuit of claim 18, wherein the maintaining phase comprises a first maintaining phase and a second maintaining phase; the gate driving circuit is further electrically connected to a fourth clock signal end; the fourth clock signal end receives a high voltage level signal to pull up the voltage level of the second node in the first maintaining phase; and the first clock signal end receives the high voltage level signal to pull down the voltage level of the second node to periodically pull down the voltage level of the second node.

20. A display panel, comprising a gate driving circuit of claim 1.

* * * * *